Figure 1:
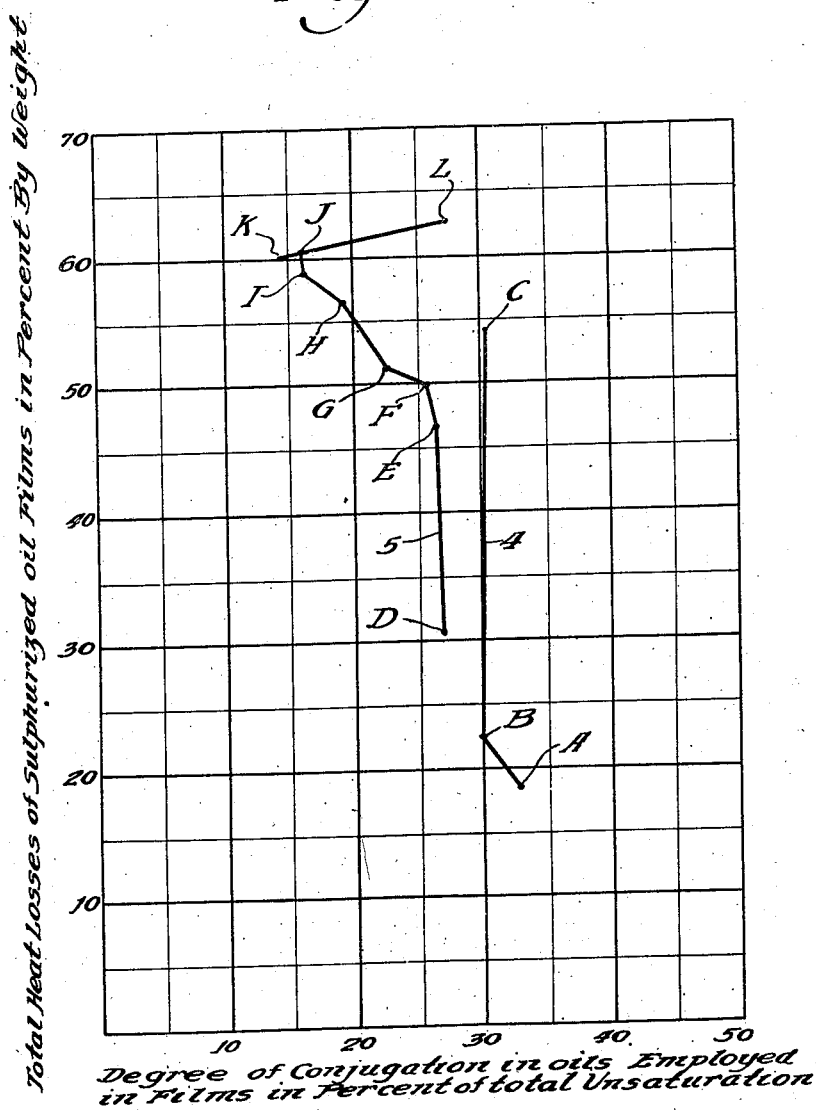

March 15, 1949. R. B. BENNETT ET AL 2,464,632
FRICTION ELEMENT
Filed Jan. 4, 1945 7 Sheets-Sheet 1

Inventors:
Robert B. Bennett
Ray E. Spokes
By Wallace and Cannon
Attorneys

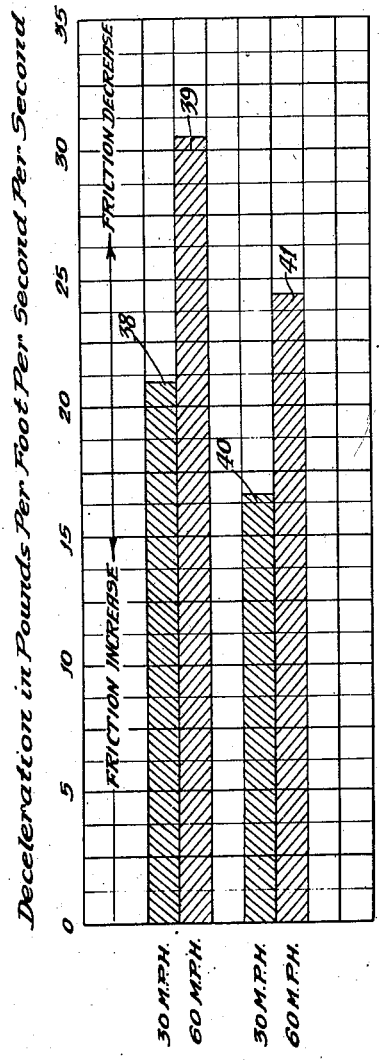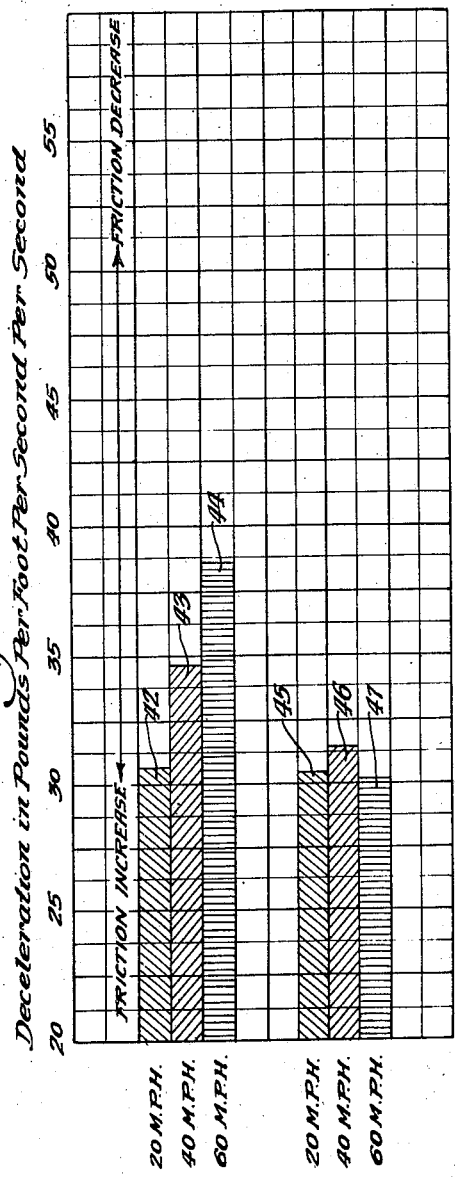

March 15, 1949.  R. B. BENNETT ET AL  2,464,632
FRICTION ELEMENT
Filed Jan. 4, 1945  7 Sheets-Sheet 7
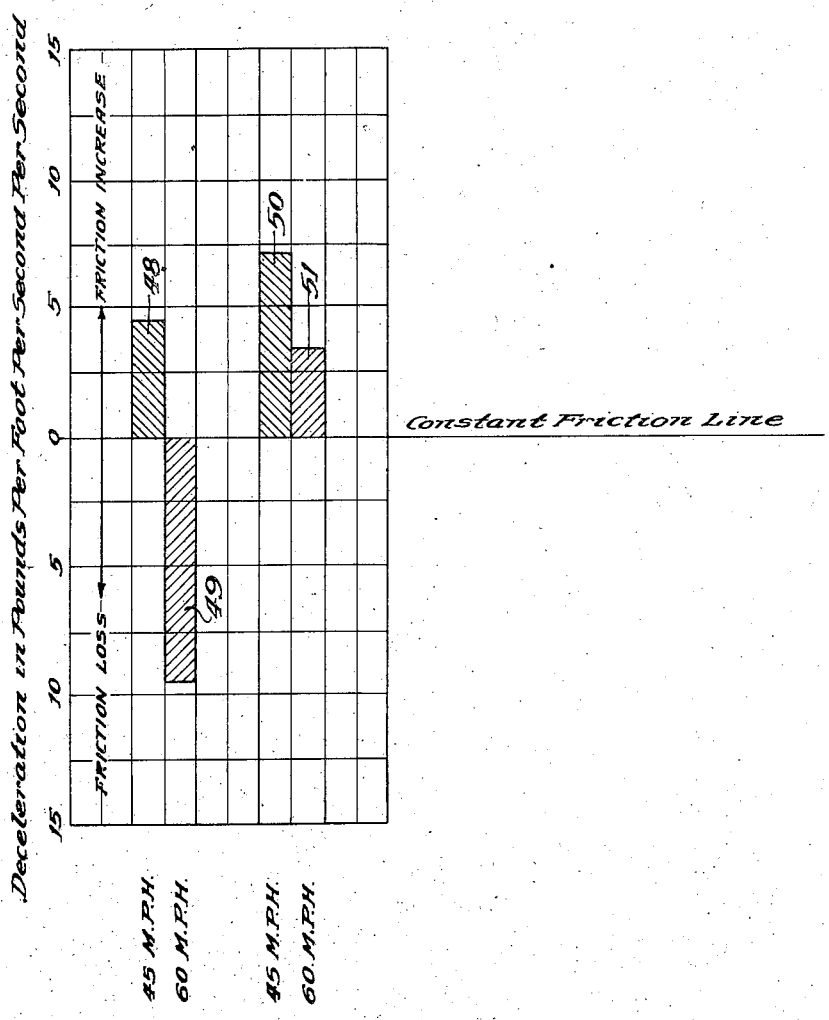

Patented Mar. 15, 1949

2,464,632

UNITED STATES PATENT OFFICE 2,464,632

FRICTION ELEMENT

Robert B. Bennett, Detroit, and Ray E. Spokes, Ann Arbor, Mich., assignors to American Brake Shoe Company, Wilmington Del., a corporation of Delaware Application January 4, 1945, Serial No. 571,276

12 Claims. (Cl. 260—19)

This invention relates to friction elements of the character which are employed as brake linings upon automotive vehicles including trucks, busses, and passenger cars, as well as for clutch facings and the like, and to a method of making such friction elements.

More particularly, the present invention relates to friction elements of the aforesaid character embodying novel bonding agents which afford and impart desirable and advantageous properties and characteristics to such friction elements including improved heat resistance and friction stability over a wide range of operating temperatures.

In general, the present invention is concerned in one of its primary aspects with the utilization in friction elements of the aforesaid character of bonding agents composed essentially of sulphurized highly conjugated vegetable drying oil fatty acid esters such, for example, as those obtained by the isomerization of soya-bean oil, linseed oil and like vegetable drying oils composed essentially of fatty acid esters having eighteen carbon atoms in the chain.

In another aspect, the present invention is concerned with the utilization in friction elements of bonding agents composed essentially of an ester higher than the glyceryl ester of the aforesaid fatty acids having eighteen carbon atoms in the chain.

As is well known, the fatty acid content of naturally occurring vegetable drying oils such, for example, as linseed oil, perilla oil, and soya bean oil, is primarily in the form of the glyceryl esters of various unsaturated fatty acids having 18 carbon atoms in the chain including linoleic acid ($C_{18}H_{32}O_2$), and linolenic acid ($C_{18}H_{30}O_2$), possessing various degrees of both conjugate and non-conjugate unsaturation.

One characteristic common to many naturally occurring as well as synthetic drying oils, and which is of especial significance insofar as the use of such oils in or as bonding agents in friction elements is concerned, is the presence in such oils of a certain number of conjugated double bonds. These conjugated double bonds are especially useful when such drying oils are used, together with sulphur, in or as bonding agents in friction elements in that they greatly improve the resistance of such sulphurized agents to heat decomposition.

Thus, for example, heat-polymerized linseed oil, cured by sulphurization, has been utilized heretofore as a bonding agent in friction elements and in certain instances friction controlling or stabilizing agents such, for example, as powdered lead formate, cashew dusts, brass, etc. have been added to such bonding agents to impart thereto improved friction stability over widely varying operating conditions and temperatures.

It has been found that the limited degree of conjugate unsaturation which is present in drying oils including certain naturally occurring vegetable drying oils such, for example, as linseed oil and soya bean oil, may be materially increased in various ways as, for example, by isolating or separating the naturally occurring higher unsaturated fatty acid content of such oils therefrom and then conjugating the isolated higher unsaturated fatty acids by alkali isomerization, or otherwise, in order to shift the unconjugated double bonds present therein into the desired conjugated position. One method of accomplishing this result is disclosed in United States Patent No. 2,350,583, which discloses a process of preparing such desirable highly conjugated oils by isomerizing polyunsaturated higher fatty acids of linseed oil, soya bean oil, and other vegetable drying oils. The result of such treatment of any such selected oil is a superior synthetic bonding oil containing a relatively large number of conjugated double bonds and the presence of which in the oil we believe to be advantageous for reasons set forth hereinbefore. When such synthetic highly conjugated oils are used in or as bonding agents in friction elements the resulting friction elements possess novel and advantageous characteristics not possessed by prior art friction elements embodying similar or comparable bonding agents including greater heat resistance of the bond and more uniform friction stability of the resulting friction elements under widely differing operating conditions and over a wide range of operating temperatures.

In the present invention we have found, however, that the heat resistance of otherwise comparable sulphurized drying oils employed in or as bonding agents in friction elements is directly proportional to the degree of conjugation or conjugate unsaturation in such oils when oils possessing equal degrees of total, that is, both conjugate and non-conjugate, unsaturation are compared. Stated otherwise, the heat resistance of such sulphurized oils having corresponding degrees of total unsaturation increases directly with the increase in the number or percentage of conjugated double bonds in the oil and, conversely, the heat resistance of such sulphurized oils decreases directly with the degree of conjugation thereof.

By the term "comparable" as used herein, we mean conjugated drying oils in which other variable factors are of the same general order so that the heat resistance of the sulphurized oils compared is directly attributable to the degree of conjugation therein, and not to other variable factors including degree of total unsaturation, percentage of sulphur in the oil, the extent of the heat treatment to which the oil has been subjected in the curing process, the extent of exposure to oxygen, and other variable factors.

We have found, further, that in order to obtain the best results in the use of such drying oils as bonding agents in friction elements, and the greatest degree of heat resistance in friction elements bonded with such sulphurized oils, it is essential not only that the selected bonding oil have a minimum degree of conjugation but also that the total unsaturation thereof be maintained within certain definite limits which will be set forth hereinafter. This is for the reason that if the total degree of unsaturation in the selected bonding oil is too high the oil will be unsatisfactory because lacking sufficient heat resistance whereas, on the other hand, if the total degree of unsaturation in the oil is too low, it is impossible to sulphurize the oil sufficiently to enable it to be employed satisfactorily as a bonding agent in friction elements.

Thus, for example, China-wood oil while more highly conjugated than a typical bonding oil which may be employed as a bonding agent in friction elements in the practice of the present invention, and to which reference will be made hereinafter, is nevertheless inferior to such oil in heat resistance because it is too highly unsaturated. On the other hand, if cottonseed oil were processed so as to impart to it a degree or percentage of conjugation which is above the minimum degree which we have found to be essential, in the use of bonding oils in friction elements in the practice of the present invention, it would still not be a satisfactory bonding oil for use in friction elements because the degree or percentage of total (conjugate and nonconjugate) unsaturation present in cottonseed oil is too low to enable it to be satisfactorily cured by sulphurization.

More specifically, in the present invention we have ascertained that friction elements having the desirable advantages and characteristics herein referred to, including significantly greater heat resistance and friction stability, over a wide range of operating conditions, are obtained by employing in or as bonding agents in such friction elements highly conjugated drying oils composed essentially of unsaturated fatty acids having 18 carbon atoms in the chain as their glyceryl or other esters herein named, and in which the extent or degree of conjugation is not substantially less than 27.5 per cent of total conjugate and nonconjugate unsaturation of the oil, and in which the total degree of both conjugated and nonconjugate unsaturation is not substantially less than that possessed by an oil having a total or Woburn iodine number of 125 and not substantially more than that possessed by an oil having a total or Woburn iodine number of 180.

Moreover, we have found that not only must oils which are to be used in or as bonding agents in friction elements possess at least the minimum degree of conjugation and a degree of total unsaturation within the limits hereinbefore specified but the necessary minimum degree of conjugation and a degree of total unsaturation within the required limits hereinbefore specified must be afforded primarily and essentially by unsaturated fatty acid esters having 18 carbon atoms in the chain rather than by unsaturated fatty acid esters having less than 18 carbon atoms in the chain, such as the esters of palmitoleic acid ($C_{16}H_{30}O_2$), or the esters of other unsaturated fatty acids which contain in excess of 18 carbon atoms in the chain, such as the esters of arachidonic acid ($C_{20}H_{32}O_2$) and the esters of clupanodonic acid ($C_{22}H_{36}O_2$).

While the so-called "diene value" method has been used heretofore for directly measuring the degree of conjugation in oils (see article by George W. Priest et al. in the Journal of Industrial and Engineering Chemistry, vol. 32, No. 10, pages 1314 to 1319, inclusive (1940)), we believe that the degree of conjugation of an oil may be more accurately determined by employing a combination of Wijs iodine titration method, which is a measure of the degree of nonconjugated unsaturation in an oil, and the Woburn iodine titration method, which is a measure of the total degree of both conjugated and nonconjugated unsaturation in an oil. (See article by J. D. von Mikusch et al., Journal of Industrial and Engineering Chemistry, analytical edition, vol. 13, No. 11, pages 782 to 789, inclusive.) Hence, by subtracting the results obtained by the use of Wijs method from those obtained by the use of the Woburn method the per cent of conjugate unsaturation in an oil tested may be calculated.

Thus, for example, in the case of a typical specimen of an oil the percentage of conjugate unsaturation relative to the total conjugate and nonconjugate unsaturation in the oil was determined as follows:

(1) The iodine number of the oil by Wijs method, indicating the degree of non-conjugate unsaturation, was _____ 158
(2) The iodine number of the oil by the Woburn method, indicating the degree of both conjugate and non-conjugate unsaturation, was _____ 233

The iodine number of the oil as determined by Wijs method (158), and which is a measure of the nonconjugate unsaturation in the oil, is then subtracted from the iodine number as determined by the Woburn method, (233), and which is a measure of the total unsaturation of the oil, and the resulting difference, when compared to the total unsaturation of the oil as measured by the Woburn iodine number considered as 100 per cent, indicates the degree or percentage of conjugate unsaturation in the oil, thus:

$$\begin{array}{r} 233 \\ -158 \\ \hline 75 \end{array}$$

75/233=32.3 per cent conjugate unsaturation in the oil.

Moreover, it will be appreciated that in determining the degree of conjugation and the amount of total unsaturation in an oil according to the methods herein referred to, or otherwise, certain limited variations from the limits herein specified may occur depending upon the accuracy of the method employed and the recognized limits of experimental error.

In the practice of the present invention the aforesaid minimum degree of conjugation which we have found to be essential to an oil to enable it to be used in or as a bonding agent in friction elements may be imparted to or afforded in selected naturally occurring or synthetic drying oils of either animal or vegetable origin by other methods in addition to the alkali isomerization process which is disclosed in the aforesaid U. S. Patent No. 2,350,583. Among such additional methods for imparting the desired minimum degree of conjugation to a selected oil or oils are the following: (a) separating from the other components of such an oil, by distillation, the conjugated unsaturated fatty acids or unsaturated fatty acid esters component of the oil having the desired aforesaid minimum degree of conjugation and the required degree of total unsaturation within the limits hereinbefore specified; (b) separating the polymer fraction from the unpolymerized monomer fraction of sufficiently heat-polymerized naturally occurring vegetable drying oils by treatment with acetone or other solvent. Thus, as one phase of the present invention we have found that by utilizing the polymer fraction of sufficiently heat-polymerized vegetable drying oils, such as linseed oil, we are able to obtain a bonding oil having in excess of the minimum degree of conjugation and having a degree of total unsaturation within the limits herein specified; (c) by dehydration of the polyhydroxy unsaturated fatty acids or unsaturated fatty acid esters present in naturally occurring oils and in certain synthetic oils; and (d) by dehydrogenation of the unsaturated fatty acids or unsaturated fatty acid esters of such oils by the halogenation-dehydrohalogenation process, catalytic removal of hydrogen, or otherwise.

Thus, we have found that the isomerized glyceryl esters and the isomerized pentaerythrityl esters of highly conjugated fatty acids which may be obtained from linseed oil or soya bean oil by the alkali isomerization process of the aforesaid Patent No. 2,350,583, or otherwise, afford suitable bonding oils for use in the practice of the present invention since such oils have a relatively high degree of conjugation well above the necessary minimum herein specified while, at the same time, having a degree of total unsaturation within the necessary limits hereinbefore specified.

We have also found that the oils of the present invention may be advantageously employed together with heretofore known oil-modified resins, and also as the oil component in oil-modified resins, in or as bonding agents in friction elements for the purpose of imparting desirable characteristics including increased heat resistance to such friction elements.

Another object of the present invention is to afford new and improved friction elements for use upon trucks, busses, passenger cars and the like and embodying the bonds of the present invention possessing superior friction characteristics including greater heat resistance in the bond and superior friction stability over widely varying operating conditions and temperatures.

A further object of the invention is to afford a novel method of making friction elements, as herein described.

An additional object of the present invention is to provide novel oil-modified resins for use as, or as a part of, the bonding agent in friction elements.

A further object of the present invention is to provide new and improved friction elements embodying the aforesaid novel oil-modified resins of the present invention.

Other and further objects of the present invention will be apparent from the following description and claims and by reference to the accompanying drawings. Other embodiments of the invention embodying the same or equivalent principles may be used and changes may be made as desired by those skilled in the art without departing from the present invention and the purview of the appended claims.

A typical formula which has been and may be followed in making friction elements according to the practice of the present invention, employing as a bonding agent synthetic highly conjugated isomerized linseed oil fatty acid esters having eighteen carbon atoms in the chain, having a suitable acid number and viscosity, and having the necessary minimum degree of conjugation and a degree of total unsaturation within the limits hereinbefore specified, is shown in the following example in which all parts indicated are by weight:

EXAMPLE 1

| | Parts by weight |
|---|---|
| Friction material (asbestos) | 60.00 |
| Bonding agent (glyceryl esters of isomerized linseed oil fatty acids having 18 carbon atoms in the chain and having a viscosity of 800 poises at atmospheric temperature and an acid number of about 2.0) | 12.75 |
| Sulphur | 2.25 |
| Barytes | 25.00 |
| Solvent (petroleum naphtha) | 7.00 |

A typical specimen of the oil referred to in that foregoing Example 1 upon analysis was shown to possess approximately 29 per cent conjugation which is somewhat in excess of the minimum degree of conjugation essential to an oil in the practice of the present invention. The same oil had a Woburn or total iodine number of 178.8 and hence came within the limits hereinbefore specified for the total unsaturation of an oil useful in the practice of the present invention.

A typical formula which has been and may be followed in making friction elements according to the present invention employing as a bonding agent a synthetic bonding oil which is composed essentially of the pentaerythrityl esters of isomerized linseed oil unsaturated fatty acids having eighteen carbon atoms in the chain and having a suitable acid number and viscosity, is shown in the following example in which all parts indicated by weight:

EXAMPLE 2

| | Parts by weight |
|---|---|
| Friction material (asbestos) | 60.00 |
| Bonding agent (pentaerythrityl esters of highly conjugated isomerized linseed oil fatty acids having 18 carbon atoms in the chain and having a viscosity of 600 poises at atmospheric temperatures and an acid number of about 6.0) | 12.75 |
| Sulphur | 2.25 |
| Barytes | 25.00 |
| Solvent (petroleum naphtha) | 7.00 |

A typical specimen of the preferred bonding oil referred to in the foregoing Example 2 was 32.6 per cent conjugated and had a Woburn iodine number of 176. Hence, this oil possessed a degree of conjugation in excess of the required minimum degree of conjugation hereinbefore set forth and it also possessed a degree of total unsaturation within the limits of the present invention.

It will be understood, however, that in the practice of the present invention the same type of oil as was employed in Example 2, or other bonding oils having higher degrees of conjugation, may be employed as bonding oils in friction elements in the practice of the present invention provided the degree of total unsaturation present in such selected oil or oils is within the limits hereinbefore specified.

A suitable formula which may be followed in the practice of the present invention, employing as a bonding agent in friction elements, the polymer fraction of a selected heat-polymerized drying oil composed essentially of the heat-polymerized fraction of unsaturated fatty acids having 18 carbon atoms in the chain and having in excess of the necessary minimum degree of conjugation and possessing a degree of total unsaturation within the limits herein specified, is shown in the following example in which all parts indicated are by weight:

EXAMPLE 3

| | Parts by weight |
|---|---|
| Friction material (asbestos) | 60.00 |
| Bonding agent (polymer fraction of heat-polymerized linseed oil bodied in vacuum and substantially free of acetone-soluble or unpolymerized monomer fraction. This oil had a viscosity of 1000 poises at atmospheric temperature, an acid number of about 2) | 12.75 |
| Sulphur | 2.25 |
| Barytes | 25.00 |
| Solvent (petroleum naphtha) | 7.00 |

EXAMPLE 4

| | Parts by weight |
|---|---|
| Friction material (asbestos) | 60.00 |
| Bonding agent (polymer fraction of heat-polymerized linseed oil bodied in an open kettle and substantially free of acetone-soluble or unpolymerized monomer fraction, having a viscosity of 1000 poises at atmospheric temperature, an acid number of about 6) | 12.75 |
| Sulphur | 2.25 |
| Barytes | 25.00 |
| Solvent (petroleum naphtha) | 7.00 |

Typical specimens of the bonding oils referred to in the foregoing Examples 3 and 4 were 27.5 per cent conjugated and had a Woburn iodine number of 143.6.

In the practice of the present invention we may employ any of the heretofore known oil-modified resins with and in place of a part of any of the bonding oils referred to in the foregoing Examples 1 to 4, inclusive, for the purpose of increasing the heat resistance of the resulting bond, or we may employ an oil-modified resin in which the oil component thereof is an oil of the present invention. In either of such instances the oil component and the oil-modified resin component of the bond are preferably mixed in about equal proportions and when employing an oil of the present invention as the oil-modified resin component of the bond preferably consists of about 40 per cent of phenolic resin and about 60 per cent of an oil of the present invention reacted together in any suitable manner such as according to a typical process which will now be described.

A typical process which may be employed in preparing an oil-modified resin having as the oil component thereof an oil of the present invention is set forth in the following example:

EXAMPLE 5

600 parts of p-tertiary amyl phenol were mixed with 153 parts, by weight, or 37.6 formaldehyde and the mixture was heated to reflux of 105° C. on an oil bath having a temperature of 130° C. 27.8 parts, by weight of 5 N sulphuric acid was then run into the mixture fast enough to enable the refluxing to be continued without outside heating. The mixture thus prepared was then further refluxed for 6.5 hours, neutralized with 10 per cent caustic soda, washed with 100 parts of water by decantation and dehydrated on a metal bath at 200° C. until the cold viscosity of the resulting resin reached 2000 poises at 25° C. One part, by weight, of the resin thus prepared was heated in a suitable vessel with 2 parts, by weight, of an oil of the present invention, namely, the pentaerythrityl ester of isomerized linseed oil unsaturated fatty acids having a viscosity or body known as No. Z. The vessel was heated on a metal bath at a temperature of from 225° C. to 250° C. for a period of 2.5 hours, and the oil-resin mixture therein was stirred during the heating operation. The resulting product was an oil-modified phenolic resin in which the oil component is an oil of the present invention and possessed a viscosity of 20,000 poises at 25° C. It will be understood, in this connection, that the viscosity of the new oil-modified resin prepared in the manner set forth above, or in any other suitable manner, depends upon the temperature to which, and the time during which, the oil-resin mixture is heated during the operation of preparing the new oil-modified resin.

A suitable composition which may be employed in preparing friction elements employing as a bond therein an oil and an oil-modified resin of the present invention is shown in the following example in which all parts indicated are by weight:

EXAMPLE 6

| | Parts by weight |
|---|---|
| Friction material (asbestos) | 60.00 |
| Bonding agent: | |
| (a) Pentaerythrityl esters of highly conjugated isomerized linseed oil fatty acids having 18 carbon atoms in the chain and having a viscosity of 600 poises at atmospheric temperatures and an acid number of about 6.0 | 6.38 |
| (b) Oil-modified phenolic resin having as the oil component thereof an oil of the present invention, said oil-modified resin being a product of the process described in the foregoing Example 5 | 6.37 |
| Sulphur | 2.25 |
| Barytes | 25.00 |
| Solvent (petroleum naphtha) | 7.00 |

It will be noted that the composition set forth in the foregoing Example 6 is similar to the composition set forth in Example 2 but differs therefrom in that in that approximately half of the bonding oil in the composition set forth in Example 2 is replaced by an oil-modified phenolic resin having as the oil component thereof an oil of the present invention, said oil-modified resin being a product of the process described in Example 5.

Another composition which may be employed in preparing friction elements according to the present invention is that which is shown in the following example in which all parts indicated are by weight:

EXAMPLE 7

| | Parts by weight |
|---|---|
| Friction material (asbestos) | 60.00 |
| Bonding agent: | |
| (a) Pentaerythrityl esters of highly conjugated isomerized linseed oil fatty acids having 18 carbon atoms in the chain and having a viscosity of 600 poises at atmospheric temperature and an acid number of about 6.0 | 6.38 |
| (b) Oil-modified phenolic resin modified with China-wood oil | 6.37 |
| Sulphur | 2.25 |
| Barytes | 25.00 |
| Solvent (petroleum naphtha) | 7.00 |

It will be noted that the composition which is set forth in the foregoing Example 7 is similar to the composition set forth in Example 6 but differs therefrom in that in place of an oil-modified phenolic resin having as the oil component thereof an oil of the present invention, as is specified in Example 6, a like quantity of an oil-modified phenolic resin modified with China-wood oil, has been substituted therefor and said oil-modified phenolic resin modified with China-wood oil is used with approximately an equal quantity, by weight, of an oil of the present invention, as the bonding agent in the composition which is set forth in Example 7.

The oil-modified phenolic resin modified with China-wood oil which is referred to in the foregoing Example 7 may be an oil-modified resin such as is disclosed in Byck Patents Nos. 1,590,079 and 1,887,883, or any other suitable oil-modified phenolic resin.

In the development of the present invention a number of heat tests were made upon sulphurized oil films of many different oils possessing different degrees of conjugated unsaturation. These tests were made by curing the sulphurized oil films at elevated temperatures and determining the various degrees of heat resistance as measured by volatility and development of acetone-soluble fraction. These tests and the percentages of volatile material and acetone-soluble material formed in such sulphurized oil films during said tests are indicative of the resistance to heat decomposition possessed by the various sulphurized oil films tested. These tests are a measure of the degree of heat resistance such sulphurized oils exhibit when used in or as bonding agents in friction elements.

As a result of the foresaid heat tests it was determined that there is a direct relationship between the degrees of conjugation in, and the heat resistance possessed by, the comparable drying oil fatty acid esters found useful as bonding agents in the practice of the present invention, other variable factors being kept constant. Thus it was found that the heat resistance of said sulphurized oil films increased directly as the degree of conjugation of the oil employed therein increased and, conversely, the heat resistance of such films decreased directly as the degree of conjugation of the oil employed decreased, when comparing oils possessing the same general degree or per cent of total unsaturation and when controlling the other variable characteristics of such oils, as pointed out hereinbefore.

It was also found that the heat resistance of such sulphurized oil films decreased directly with an increase in the total unsaturation of the oil when comparing oils having the same degree of conjugation.

It was further found, and this is an important phase of the present invention, that sulphurized oil films composed essentially of the pentaerythrityl esters of highly conjugated isomerized linseed oil fatty acids having 18 carbon atoms in the chain, as referred to in the foregoing Example 2, exhibited the greatest degree of heat resistance of any of the numerous oils tested. This was shown by the fact that of all the sulphurized oil films tested the sulphurized oil films made of this oil exhibited the lowest percentage of volatile material lost during the operation of curing the films and the lowest percentage of acetone-soluble products caused by heat decomposition during the curing operation. A typical specimen of such an oil employed showed 32.6 per cent conjugation and had a Woburn iodine number of 176, and hence came within the requirements as to minimum degree of conjugation and maximum and minimum limits of total unsaturation as hereinbefore set forth.

The aforesaid findings were also corroborated by friction and wear tests on the dynamometer upon specimens of friction elements bonded with the bonding oil referred to immediately above and upon specimens of friction elements bonded with a comparable prior art oil. Such dynamometer and wear tests will be described hereinafter and the results thereof are illustrated in the graphs shown in Figs. 4 to 8, inclusive, of the drawings.

In making the aforesaid heat tests, sulphurized oil films composed of all of the known naturally occurring and synthetic drying oils of vegetable and animal origin, which offered any possibilities for commercial use, were tested and the results of said heat tests are shown in the following Tables 1, 2, 3, 4 and 5, as well as in the graphs illustrated in Figs. 1, 2 and 3 of the drawings and which illustrate graphically the data shown in the aforesaid tables:

Table 1

| Sulphurized Film Composed of | Oil A | Oil B | Oil C |
|---|---|---|---|
| (1) Percentage of Acetone-Soluble Material Formed In Film During Preliminary Curing Operation | 5.94 | 6.80 | 8.80 |
| *After Further Curing Film 1 Hour at 315° C.* | | | |
| (2) Percentage Volatile Material Lost | 2.61 | 3.86 | 14.9 |
| (3) Percentage Acetone-Soluble Material Formed | 10.4 | 11.8 | 30.3 |
| (4) Total Percentage of Weight of Film Lost | 18.59 | 22.46 | 54.0 |
| *After Curing Film One Additional Hour at 350° C.* | | | |
| (5) Percentage Acetone-Soluble Material Formed | 5.91 | 12.0 | 31.0 |
| (6) Percentage Volatile Material Lost | 1.01 | 2.68 | 21.7 |
| (7) Percentage Conjugation in Oil | 32.6 | 29.9 | 30.4 |
| (8) Woburn Iodine Number of Oil (Total Unsaturation) | 176 | 178.8 | 184.4 |
| (9) Acid Number of Oil | 4.9 | 2.1 | 5.2 |
| (10) Viscosity of Oil in poises at 25° C | 534 | 540 | 435 |

Table 2

| Sulphurized Film Composed of | Oil D | Oil E | Oil F | Oil G | Oil H | Oil I | Oil J | Oil K | Oil L |
|---|---|---|---|---|---|---|---|---|---|
| (1) Percentage of Acetone-Soluble Material Formed in Film During Preliminary Curing Operation | 6.75 | 14.7 | 12.7 | 18.8 | 10.9 | 15.8 | 13.3 | 20.0 | 17.7 |
| *After Further Curing Film 1 Hour at 315° C.* | | | | | | | | | |
| (2) Percentage Volatile Material Lost | 4.48 | 7.25 | 8.03 | 11.0 | 8.30 | 9.42 | 8.15 | 8.52 | 15.0 |
| (3) Percentage Acetone-Soluble Material Formed | 19.5 | 25.0 | 29.3 | 21.3 | 27.1 | 23.6 | 39.2 | 31.6 | 30.0 |
| (4) Total Percentage of Weight of Film Lost | 30.73 | 46.95 | 50.03 | 51.1 | 56.3 | 58.82 | 60.65 | 60.12 | 62.7 |
| *After Curing Film One Additional Hour at 350° C.* | | | | | | | | | |
| (5) Percentage Acetone-Soluble Material Formed | | | | | | | | | |
| (6) Percentage Volatile Material Lost | | | | | | | | | |
| (7) Percentage Conjugation in Oil | 27.5 | 26.5 | 25.7 | 22.7 | 19.3 | 16.3 | 16.1 | 14.6 | 27.4 |
| (8) Woburn Iodine Number of Oil (Total Unsaturation) | 143.6 | 145.5 | 153.5 | 160.6 | 139.4 | 138.2 | 150.6 | 139.4 | 171.1 |
| (9) Acid Number of Oil | 1.0 | 8.6 | 5.36 | 9.6 | 5.02 | 3.5 | 2.4 | 1.76 | 4.1 |
| (10) Viscosity of Oil in poises at 25° C | 1340 | 1000+ | 435 | 1000+ | 665 | 1000+ | 1150 | 800 | 436 |

Table 3

| Sulphurized Oil Film Composed of | Oil A | Oil B | Oil C | Oil D |
|---|---|---|---|---|
| (1) Percentage of Acetone-Soluble Material Formed in Film During Preliminary Curing Operation | 5.94 | 6.80 | 8.80 | 6.75 |
| *After Further Curing Film 1 Hour at 315° C.* | | | | |
| (2) Percentage Volatile Material Lost | 2.61 | 3.86 | 14.9 | 4.48 |
| (3) Percentage Acetone-Soluble Material Formed | 10.4 | 11.8 | 30.3 | 19.5 |
| (4) Total Percentage of Weight of Film Lost | 18.59 | 22.46 | 54.0 | 30.73 |
| *After Curing Film 1 Additional Hour at 350° C.* | | | | |
| (5) Percentage Acetone-Soluble Material Formed | 5.91 | 12.00 | 31.0 | |
| (6) Percentage Volatile Material Lost | 1.01 | 2.68 | 21.7 | |
| (7) Percentage of Conjugation in Oil | 32.6 | 29.9 | 30.4 | 27.5 |
| (8) Woburn Iodine Number of Oil (Total Unsaturation) | 176 | 176.8 | 184.4 | 143.6 |
| (9) Acid Number of Oil | 4.9 | 2.1 | 5.2 | 1.0 |
| (10) Viscosity of Oil In Poises at 25° C | 534 | 540 | 435 | 1340 |

Table 4

| Sulphurized Film Composed of | Group 1 | | | Group 2 | | | | |
|---|---|---|---|---|---|---|---|---|
| | Oil E | Oil F | Oil G | Oil H | Oil I | Oil J | Oil K | Oil L |
| (1) Percentage of Acetone-Soluble Material Formed in Film During Preliminary Curing Operation | 14.7 | 12.7 | 18.8 | 10.9 | 15.8 | 13.3 | 20.0 | 17.7 |
| *After Further Curing 1 Hour at 315° C.* | | | | | | | | |
| (2) Percentage Volatile Material Lost | 7.25 | 8.04 | 11.0 | 8.30 | 9.42 | 8.15 | 8.52 | 15.0 |
| (3) Percentage Acetone-Soluble Material Formed | 25.0 | 29.3 | 21.3 | 27.1 | 23.6 | 39.2 | 31.6 | 30.0 |
| (4) Total Percentage of Weight of Film Lost | 46.95 | 50.03 | 51.1 | 56.3 | 58.82 | 60.65 | 60.12 | 62.7 |
| *After Curing Film 1 Additional Hour at 350° C.* | | | | | | | | |
| (5) Percentage Acetone-Soluble Material Formed | | | | | | | | |
| (6) Percentage Volatile Material Lost | | | | | | | | |
| (7) Percentage of Conjugation in Oil | 26.5 | 25.7 | 22.7 | 19.3 | 16.3 | 16.1 | 14.6 | 27.4 |
| (8) Woburn Iodine Number of Oil (Total Unsaturation) | 145.5 | 153.5 | 160.6 | 139.4 | 138.2 | 150.6 | 139.4 | 171.1 |
| (9) Acid Number of Oil | 8.6 | 5.36 | 916 | 5.02 | 3.5 | 2.4 | 1.76 | 4.1 |
| (10) Viscosity of Oil in poises at 25° C | 1000+ | 435 | 1000+ | 665 | 1000+ | 1150 | 800 | 436 |

Table 5

|  | Pair 1 | | Pair 2 | | Pair 3 | |
| --- | --- | --- | --- | --- | --- | --- |
| Sulphurized Oil Film Composed of | Oil M (Glyceryl Ester) | Oil N (P. E. Ester) | Oil O (Glyceryl Ester) | Oil P (P. E. Ester) | Oil Q (Glyceryl Ester) | Oil R (P. E. Ester) |
| (1) Percentage of Acetone-Soluble Material Formed in Film During Preliminary Curing Operation | 6.80 | 5.94 | 20.0 | 14.6 | 17.5 | 17.2 |
| *After Further Curing Film 1 Hour at 315° C.* | | | | | | |
| (2) Percentage Volatile Material Lost | 3.86 | 2.61 | 8.52 | 7.98 | 18.0 | 7.07 |
| (3) Percentage Acetone-Soluble Material Formed | 11.8 | 10.4 | 31.6 | 16.4 | 28.9 | 25.4 |
| (4) Total Percentage of Weight of Film Lost | 22.46 | 18.95 | 60.12 | 28.98 | 64.4 | 49.67 |
| *After Curing Film 1 Additional Hour at 350° C.* | | | | | | |
| (5) Percentage Acetone-Soluble Material Formed | 12.00 | 5.91 | 30.00 | 19.7 | | |
| (6) Percentage Volatile Material Lost | 2.68 | 1.01 | 15.0 | 3.40 | | |
| (7) Percentage of Conjugation in Oil | 29.9 | 32.6 | 14.6 | 14.5 | 10 | 25.2 |
| (8) Woburn Iodine No. of Oil | 178.8 | 176.0 | 139.4 | 138.0 | 118 | 117.8 |
| (9) Acid Number of Oil | 2.1 | 4.9 | 1.76 | 2.63 | 4.0 | 4.20 |
| (10) Viscosity of Oil in poises at 25° C | 540 | 534 | 800 | 840 | 833 | 580 |

List of oils referred to in Tables 1 to 5, inclusive

| Designation of Oil In Tables | Description or Name of Oil (All Derived From Unsaturated Fatty Acids Having 18 Carbon Atoms in the Chain) |
| --- | --- |
| A | Pentaerythrityl Esters of Isomerized linseed oil unsaturated fatty acids. |
| B | Glyceride Esters of Isomerized linseed oil unsaturated fatty acids. |
| C | Oiticica Oil. |
| D | Polymer fraction of heat polymerized linseed oil substantially free of acetone-soluble unpolymerized or monomer fraction. |
| E | Dehydrated castor oil. |
| F | Do. |
| G | A modified vegetable drying oil. |
| H | Dehydrated castor oil. |
| I | A modified vegetable drying oil. |
| J | Modified fish oil. |
| K | Purely polymerized linseed oil. |
| L | Modified fish oil. |
| M | Glyceryl esters of isomerized linseed oil unsaturated fatty acids. |
| N | Pentaerythrityl esters of isomerized linseed oil unsaturated fatty acids. |
| O | Purely polymerized linseed oil. |
| P | Pentaerythritol linate. |
| Q | Glyceryl esters of soya bean oil unsaturated fatty acids. |
| R | Pentaerythrityl esters of soya bean oil unsaturated fatty acids. |

In preparing the sulphurized oil films all of the oils referred to in the foregoing list were employed as oils bodied to a viscosity above 400 poises at 25° C.

The foregoing Tables 1 and 2 show the relationship between the heat resistance of the sulphurized oil films tested and the comparative percentages of conjugation present in the oils employed in making the sulphurized oil films tested.

As may be seen by reference to Table 1 the sulphurized oil films referred to therein were composed of oils having at least the necessary minimum percentage of conjugation required in the practice of the present invention, with other variable factors including the degree of total unsaturation being of the same general order. Certain of the oils employed in making the sulphurized oil films referred to in Table 1, namely, oils A and B, also possessed a degree of total unsaturation within the limits required in the practice of the present invention whereas the degree of total unsaturation possessed by oil C was in excess of the maximum permissible degree of total unsaturation hereinbefore specified. The effect of this may be seen by comparing the total heat losses in the sulphurized oil films tested and as shown in horizontal row 4 of Table 1.

With one exception, which will be referred to hereinafter, (oil D) the oils employed in making the sulphurized oil films tested, and the results of which are referred to in Table 2, possessed a degree of conjugation below the minimum required of an oil in the practice of the present invention, other variable factors including the degree of total unsaturation being of the general order.

Thus by comparing the total heat losses of the sulphurized oil films tested, as shown in horizontal row 4 of Tables 1 and 2 the superior heat resistance of the sulphurized oil films composed of otherwise satisfactory oils, having at least the minimum degree of conjugation required in an oil to enable it to be used in the practice of the present invention, may be seen.

Tables 3 and 4 show the relationship between the degree of total unsaturation in the oils employed in making the sulphurized oil films tested and the comparative degrees of heat resistance possessed by said films, other variable factors in such oils, including percentage of conjugation, being of the same general order.

By reference to Table 3 it will be noted that the sulphurized oil films referred to in this table were composed of oils which possessed at least the minimum degree of conjugation required of an oil to enable it to be used in the practice of the present invention and all of the oils referred to in Table 3 except one (oil C) contained a degree of total unsaturation within the limits hereinbefore specified. The varying degrees of total unsaturation of all of the oils referred to in Table 3 were of the same general order as were other variable factors.

Table 4 contains significant data compiled from the aforesaid heat tests upon sulphurized oil films composed of oils having a degree of total unsaturation within the limits required in the practice of the present invention but all of which oils except one, namely, oil L, contained a degree or percentage of conjugation below the minimum degree of conjugation hereinbefore specified. The degree of total unsaturation of the oils referred to in Table 4, and other variable factors of the oils referred to in this table, were of the same general order. In order better to show the relationship between heat resistance and degree of total unsaturation the oils referred to in Table 4 are divided into two groups 1 and 2 each composed of oils having degrees of conjugation and total unsaturation of the same general order with the exception of oil L hereinbefore referred to.

The data in Table 5 shows the superior heat resistance of sulphurized oil films composed of the pentaerythrityl esters of unsaturated fatty acids having 18 carbon atoms in the chain over the glyceryl esters of the same fatty acids, as revealed by certain of the heat tests upon sulphurized oil films hereinbefore referred to. In order to show the comparative degrees of heat resistance possessed by the sulphurized film tests the oils referred to in Table 5 are arranged in three pairs, each pair consisting of an oil composed of the glyceryl esters of unsaturated fatty acids having 18 carbon atoms in the chain and an oil composed of the pentaerythrityl esters of the same unsaturated fatty acids.

The data shown in numbered horizontal row 1 in Tables 1 to 5, inclusive, were compiled from analyses of sulphurized oil films cured during a fifteen hour cycle progressively increasing temperatures of from 80° C. to 170° C. The thus cured sulphurized films were then further subjected to heat at a temperature of 315° C. for a period of one hour, whereupon specimens of the thus heated films were tested to determine (a) the percentage of volatile material lost as a result of the heating operation, and (b) the percentage of acetone-soluble products of heat decomposition formed in the films as a result of the heating operation. These data are shown in numbered horizontal row (2) and in numbered horizontal row (3), respectively, in the tables.

The total percentage of the weight of each sulphurized oil film lost during both the aforesaid preliminary curing operation and during the subsequent heating operation at 315° C. is shown in numbered horizontal row (4) in the tables.

The thus cured sulphurized oil films were thereupon heat treated an additional hour at a higher temperature of 350° C., whereupon the films were again tested to determine the percentages of acetone-soluble products of heat decomposition formed in the films, and the percentage of the weight of each film lost in the form of volatile matter formed as a result of the curing operation at 350° C. These data are shown in numbered horizontal rows (5) and (6), respectively, in the tables.

The data in numbered horizontal row (7) in each of the tables show the degree of conjugation in each of the oils employed in making the sulphurized oil films tested, as expressed in terms of percentage of conjugate unsaturation present in the oils relative to the total degree of both conjugate and nonconjugate unsaturation, as hereinbefore described.

The data in numbered horizontal row (8) in the tables show the Woburn iodine number of each of the oils employed in making the sulphurized oil films tested, thus indicating the comparative degrees of total unsaturation in the oils employed in making the films. The data in numbered horizontal row (9) in the tables show the acid number of the oils employed in making the sulphurized oil films tested, and the data in numbered row (10) of each of the tables show the viscosities of said oils in terms of poises at 25° C.

By reference to the oils referred to in Table 1 it will be noted that these oils, namely, oils A, B and C, all possessed a relatively high degree of total unsaturation, as indicated by their Woburn iodine numbers of 176, 178.8 and 184.4, respectively.

On the other hand, with one exception (oil L), all of the oils referred to in Table 2, namely, oils D, E, F, G, H, I, J and K had a relatively low degree of total unsaturation, as shown by their Woburn iodine numbers of 143.6, 145.5, 153.5, 160.6, 139.4, 138.2, 150.6 and 139.4, respectively. However, only one of the oils in Table 2, namely, oil D, had the necessary minimum degree of conjugation herein specified.

By reference to numbered horizontal row (4) in Table 1 it will be noted that the total percentages of the weights of the sulphurized oil films composed of oils A and B which were lost during the preliminary curing operation and during the ensuing curing operation at 315° C. were 18.59 per cent and 22.46 per cent, respectively. These losses were inversely related to the degrees of conjugation in the respective oils, namely, 32.6 per cent and 29.9 per cent, respectively, (horizontal row 7 in Table 1), in oils having the same general degree of total unsaturation as shown by their Woburn iodine numbers of 176 and 178.8, respectively, (horizontal row 8 in Table 1). Oil A was composed essentially of the pentaerythrityl esters of isomerized unsaturated linseed oil fatty acids having 18 carbon atoms in the chain and oil B was composed essentially of the glyceride esters of isomerized unsaturated linseed oil fatty acids having 18 carbon atoms in the chain.

However, upon reference to the data in Table 1 showing the results of the tests made upon sulphurized oil films composed of oil C (oiticica oil) it will be noted (horizontal row 4) that the total percentage of the weight of the film lost during the preliminary curing operation and during the subsequent curing operation at 315° C. (54.0 per cent) was approximately three times as great as that of the film composed of oil A (18.59 per cent) and approximately two and a half times as great as that of the film composed of oil B (22.46 per cent), even though the variation in the percentage of conjugation in the three oils (A, B and C) was relatively very small (32.6, 29.9 and 30.4 per cent, respectively, see horizontal row 7 in Table 1). The explanation of this phenomenon resides in the fact that even though the degree of conjugation in oil C (30.4 per cent, see horizontal row 7 in Table 1) was above the minimum degree of conjugation hereinbefore specified, (not substantially less than 27.5) the degree of total unsaturation in oil C was too great to impart to the film composed of that oil the heat resistance possessed by those oils which are useful as bonding agents in friction elements in the practice of the present invention. Thus by reference to horizontal row 8 in Table 1 it will be noted that the Woburn iodine number of oil C was 184.4 and hence the degree of total unsaturation of this oil, as measured by its Woburn iodine number, was substantially greater than the maximum permissible upper limit of total unsaturation in an oil which may be used in or as a bonding agent in friction elements in the practice of the present invention, namely, an oil having a Woburn iodine number not substantially in excess of 180.

All but one of the oils (oil D) in Table 2 possessed percentages of conjugation below the minimum of not substantially less than 27.5 hereinbefore specified (see horizontal row 7 in Table 2), and all but one of the sulphurized oil films made from the oils in this group (the film made from oil D) exhibited unsatisfactorily high percentages of loss of weight after the preliminary curing operation and after the completion of the further curing operation at 315° C., (horizontal row 4 in Table 2), even though all of the oils in this group possessed degrees of total unsaturation (horizontal row 8 in Table 8) within the limits herein specified.

Oil D in Table 2 was composed of the polymer fraction of a heat-polymerized linseed oil substantially free of acetone-soluble unpolymerized or monomer fraction of the original oil. As shown in Table 2, a sulphurized film made from oil D showed a total heat loss of 30.73 per cent, which was comparable to the total heat losses of sulphurized films made from oils A and B in Table 1, rather than to the heat losses of sulphurized films made from oil C in Table 1 and oils F to L, inclusive, in Table 2. This was due to the fact that oil D contained the requisite minimum degree of conjugation required in the practice of the present invention, namely, 27.5 per cent, and it also possessed the requisite amount of total unsaturation herein specified as indicated by its Woburn iodine number of 143.6.

Oils E, F, H, and I were oils in which the degree of conjugation in the oil had been increased by a process of dehydration or dehydroxylation and are further identified in the list of oils referred to in the foregoing Tables 1 to 5, inclusive, whereas oil K was a purely polymerized linseed oil.

Hence, it will be seen from Tables 1 and 2 that in otherwise comparable oils having comparable degrees of total unsaturation within the limits herein specified, the heat resistance of sulphurized oil films made from such oils increases directly with an increase in the degree of conjugation in the oil and, conversely, decreases directly with a decrease in the degree of conjugation in such oil (compare oils A, B and C in Table 1 and oils D to K, inclusive, in Table 2).

It will likewise be seen from Tables 1 and 2 that in order to ensure the desired relatively high degree of heat resistance in a sulphurized oil film, as is assured in the practice of the present invention, it is essential not only that the percentage of conjugation in an oil be at least equal to or above the minimum of 27.5 per cent herein specified, but that the degree of total unsaturation in an oil possessing the requisite percentage of conjugation be maintained within the limits of total unsaturation herein specified.

It will be noted by reference to Table 2 that the sulphurized oil film composed of oil L (which was a fish oil) showed an unsatisfactory very high total loss of 62.7 per cent of its initial weight after the completion of the preliminary curing operation and the subsequent heating operations at 315° C. and 350° C. (see horizontal row 4 in Table 2), notwithstanding the fact that the degree of total unsaturation in this oil, as shown by its Woburn iodine number of 171.1 (see horizontal row 8 in Table 2) and its percentage of conjugation (27.4, see horizontal row 7) was just slightly below the lower limit of the minimum degree of conjugation (27.5 per cent) required in the practice of the present invention.

However, as pointed out hereinbefore, we have found that not only must oils which are to be used in or as bonding agents in friction elements possess at least the minimum degree of conjugation and a degree of total unsaturation within the limits hereinbefore specified but the necessary minimum degree of conjugation and a degree of total unsaturation within the required limits hereinbefore specified must be afforded primarily and essentially by unsaturated fatty acid esters having 18 carbon atoms in the chain, rather than by unsaturated fatty acid esters having less than 18 carbon atoms in the chain, such as the esters of palmitoleic acid ($C_{16}H_{30}O_2$), or the esters of other unsaturated fatty acids which contain in excess of 18 carbon atoms in the chain, such as the esters of arachidonic acid ($C_{20}H_{32}O_2$) and the esters of clupanodonic acid ($C_{22}H_{36}O_2$).

Thus, oil L was a fish oil containing a relatively large percentage of esters of saturated fatty acids of the $C_nH_{2n}O_2$ type and relatively large percentages of esters of palmitoleic acid ($C_{16}H_{30}O_2$), of arachidonic acid ($C_{20}H_{32}O_2$) and of clupanodonic acid ($C_{22}H_{36}O_2$). We found that an oil composed primarily of esters of such unsaturated fatty acids are not satisfactory for use in the present invention even though the percentages of conjugation and the degree of total unsaturation in such oil came within the limits herein specified. Hence we have found that it is essential to the present invention that the desired minimum degree of conjugation and the required degree of total unsaturation herein specified be afforded by an oil or oils composed essentially of esters of unsaturated fatty acids having 18 carbon atoms in the chain. This is true of all of the oils referred to in Tables 1 to 5, inclusive, except the aforesaid oil L.

Tables 3 and 4 contain the same data which are shown in Tables 1 and 2, which have been analyzed hereinbefore, and were compiled from tests upon the same sulphurized oil films as are referred to in Tables 1 and 2. However, rather than arranging the sulphurized oil films and the significant data relative thereto in two groups, namely, those relating to oils possessing relatively high and those relating to oils possessing relatively low degrees of total unsaturation, respectively, as in the case of the oils referred to in Tables 1 and 2, in Tables 3 and 4, the oils are grouped into three groups with the oils in each group possessing corresponding degrees of conjugation. Thus oils A, B, C and D, which are shown in Table 3 had relatively high percentages of conjugation of 32.6, 29.9, 30.4 and 27.5, all above the minimum herein specified. Group 1 in Table 4, composed of oils E, F, and G had percentages of conjugation of 26.5, 25.7 and 22.7, all below the minimum herein called for; and group 2 in Table 4, composed of oils H, I, J, K and L had still lower percentages of conjugation of 19.3, 16.3, 16.1, 14.6 and 27.4, all below the minimum required of an oil to enable it to be used as a bonding oil in friction elements in the practice of the present invention (see horizontal row 7 in Table 4).

By comparing the percentages of total loss in weight in the sulphurized oil films of each of the three ranges, as shown in horizontal row 4 of Tables 3 and 4, as a result of the preliminary curing operation and as a result of the further heating operation at 315° C., with the degrees of total unsaturation of the oils, as shown in horizontal row 8 in Tables 3 and 4, it will be observed that for oils having comparable degrees of conjugation, the heat resistance of the sulphurized oil films made therefrom decreased with an increase in total unsaturation in the oils.

Table 5 illustrates a phase of the present invention hereinbefore pointed out, namely, that sulphurized oil films composed of the pentaerythrityl esters drying oil fatty acids show greater heat resistance than the glyceryl esters of such drying oil fatty acids, all other variable factors including degree of conjugation and amount of total unsaturation being equal or comparable. Moreover, we have found that this is true even though the percentage of conjugation in the oil is below the minimum limit herein specified and even though the amount of total unsaturation in the oil is outside the limits herein set forth.

Thus it will be noted by reference to Table 5 that the oils therein referred to are arranged in three pairs, with each pair consisting of (1) an oil which is composed essentially of the glyceryl esters of unsaturated drying oil fatty acids and (2) an oil which is otherwise similar to the other oil in the same pair except for the fact that the pentaerythrityl ester has been substituted for the glyceryl ester.

Thus pair 1 in Table 5 consisted of oil M, which was composed essentially of the glyceryl esters of slow drying isomerized unsaturated linseed oil fatty acids, and oil N which was composed essentially of the pentaerythrityl esters of fast drying isomerized unsaturated linseed oil fatty acids. Pair 2 in Table 5 consisted of oil O, which was composed essentially of a medium drying so-called purely (heat) polymerized natural linseed oil, that is, a heat-polymerized linseed oil composed of the glyceryl esters of unsaturated linseed oil fatty acids containing substantially no oxidized oil, and oil P which was an oil otherwise comparable to oil O but in which the pentaerythrityl esters had been substituted for the glyceryl esters of the same unsaturated fatty acids. Pair 3 in Table 5 consisted of oil Q, which was composed essentially of the glyceryl esters of semidrying unsaturated soya oil fatty acids, and oil R which was an oil otherwise similar to oil Q but in which the pentaerythrityl ester had been substituted for the glyceryl ester of the same semidrying unsaturated soya oil fatty acids.

It will be noted by reference to the percentages of heat losses shown in horizontal row 4 of Table 5, and which represent the percentages of total loss in weight of the cured sulphurized oil films after the completion of the preliminary curing operation and after the subsequent heating operation at 315° C. that the sulphurized films composed of the oils which were essentially pentaerythrityl esters of various unsaturated fatty acids were in every instance more heat resistant than the glyceryl esters of the same fatty acids. Such heat losses are a measure of the comparative heat resistances of such sulphurized oils employed in or as bonding agents in friction elements. Hence we have found that the pentaerythrityl esters of unsaturated fatty acids are, in general superior for use in or as bonding agents in friction elements to the glyceryl esters of the corresponding fatty acids.

Figure 2:
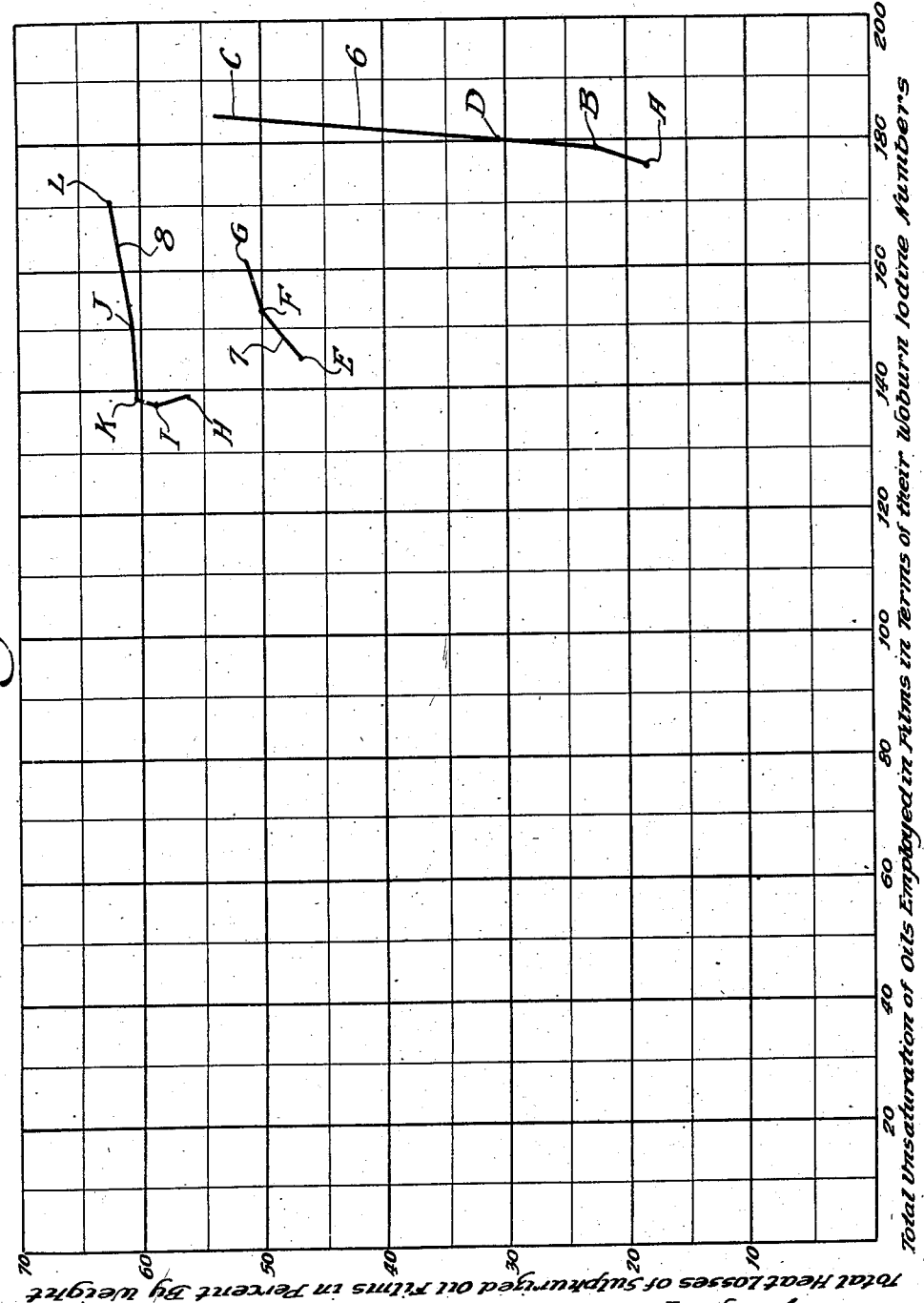
Figure 3:
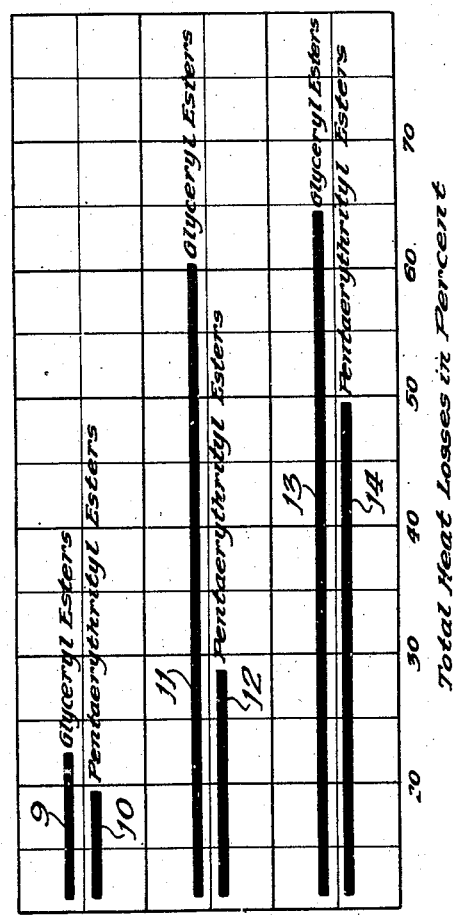

Certain of the significant data shown in Tables 1 to 5, inclusive, are embodied in the graphs illustrated in Figs. 1, 2 and 3 of the drawings. Thus the relationship between the various degrees of conjugation in the oils referred to in Table 1 and the total heat losses of the sulphurized films referred to in Table 1 are illustrated in graph 4 in Fig. 1, and the relationship between the various percentages of conjugation in the oils referred to in Table 2 and the total heat losses of the sulphurized oil films referred to in Table 2 are shown in the form of graph 5 in Fig. 1. The ordinates in Fig. 1 represent the total heat losses of the sulphurized films in percent, as set forth in horizontal row 4 in Tables 1 and 2, and the abscissae represent the percentages of conjugation in the oils employed in making the sulphurized oil films, as set forth in horizontal row 7 in Tables 1 and 2.

The letters A, B and C on graph 4 in Fig. 1 refer to the correspondingly identified oils in Table 1 and letters D to L, inclusive, on graph 5 in Fig. 1 refer to oils D to L, inclusive, respectively in Table 2.

By reference to graph 4 in Fig. 1 it will be noted that the per cent of total heat loss of the sulphurized oil films rose rapidly between points A and B (oils A and B in Table 1) with a comparatively small decrease in per cent of conjugation.

It is significant to note that there is a very sharp rise in graph 4 in Fig. 1 between points B and C (oils B and C in Table 1), indicating a marked increase in per cent of heat loss of the sulphurized oil films, even though there was a slight increase in percentage of conjugation. As pointed out hereinbefore, this was due to the fact that the degree of total unsaturation (184.4) in oil C (oiticica oil) is above the upper limit (180.0) hereinbefore specified.

It is also significant to note that there is a very sharp rise in graph 5 in Fig. 1 between points D and E (oils D and E in Table 2), indicating a pronounced increase in per cent of total heat losses of the sulphurized oil films tested, even though the decrease in percentage of conjugation between the two oils D and E (27.5 and 26.5) was relatively small and represented only a drop of 1 per cent below the critical lower limit of percentage of conjugation (27.5) hereinbefore specified.

The more gradual rise in graph 5 in Fig. 1 between points E and J (oils E to J, inclusive, in Table 2) illustrates the manner in which the percent of total heat losses in the sulphurized oil films tested rose with decreases in the percentages of conjugation of the aforesaid oils E to J, inclusive; a subsequent slight irregularity being noted between points J and K on graph 5 in Fig. 1 (oils J and K in Table 2).

The character of that portion of graph 5 in Fig. 1 between points K and L (oils K and L in Table 2) is significant since between these two points the per cent of conjugation in the oils rose from 14.6 for oil K to 27.4 for oil L (horizontal row 7 in Table 2) while, notwithstanding such a marked increase in percentage of conjugation (from a point (14.6) far below the minimum herein specified (27.5) to a point (27.4) only slightly below said minimum lower limit of percentage of conjugation), there was an increase in the percentage of total heat losses in the sulphurized oil films composed of these oils (K and L) from 60.12 to 62.7 (see horizontal row 4 in Table 2) rather than a decrease in percentage of total heat losses of the sulphurized oil films as might have been expected. As explained hereinbefore, this was due to the fact that oil L was a fish oil containing a relatively large percentage of esters of unsaturated fatty acids having less than or more than 18 carbon atoms in the chain and hence this oil is unsatisfactory for use in the practice of the present invention even though it possessed a degree of total unsaturation within the limits herein specified as shown by its Woburn iodine number of 171.1 (see horizontal row 8 in Table 2).

The ordinates in Fig. 2 represent the total heat losses as set forth in horizontal row 4 of Tables 3 and 4 and the abscissae in this figure represent the various degrees of total unsaturation in the oils employed in making the sulphurized oil films tested as indicated by the Woburn iodine numbers of said oils which are set forth in horizontal row 8 of each of Tables 3 and 4.

Thus graph 6 in Fig. 2 illustrates the relationship between the varying degrees of total unsaturation of the oils referred to in Table 3 (horizontal row 8) and the heat losses of the sulphurized oil films tested as set forth in horizontal row 4 of Table 3. The letters D, A, B and C on this graph refer to the correspondingly identified oils referred to in Table 3.

By reference to graph 6 in Fig. 2 it will be noted that the percentage of heat losses in the sulphurized oil films tested increased rapidly after the Woburn iodine numbers of the oils passed the upper limit of 180 hereinbefore specified, as shown by the sharp rise of graph 6 between points B and C and between which points this graph crosses the vertical line or ordinate which represents the permissible upper limit of total unsaturation hereinbefore specified and as represented by a Woburn iodine number of 180.

Graphs 7 and 8 in Fig. 2 illustrate graphically the data set forth in horizontal rows 4 and 8 of groups 1 and 2, respectively, in Table 4 and show how the total heat losses of the sulphurized oil films tested varied directly with an increase in the total unsaturation of the oils employed. The letters E, F and G on graph 7 refer to the correspondingly identified oils which are referred to in group 1 of Table 4 and the letters, H, I, K, J and L on graph 8 refer to the similarly identified oils which are referred to in group 2 of Table 4.

In Fig. 3 the abscissae represent the varying percentages of heat losses in the sulphurized oil films tested as set forth in horizontal row 4 in Table 5. Graphs 9 and 10 in Fig. 3 illustrate graphically the data set forth in horizontal row 4 of Table 5 as to pair 1 of the sulphurized oil films therein referred to and show the superior heat resistance of the pentaerythrityl ester oils over the glyceryl esters of the same unsaturated fatty acids as shown by the shorter length of graph 10 as compared to graph 9.

Graphs 11 and 12 in Fig. 3 illustrate graphically the data set forth in horizontal row 4 of Table 5 as to pair 2 of the sulphurized oil films therein referred to and also show the superior heat resistance of the pentaerythrityl ester oils over the glyceryl esters of the same unsaturated fatty acids as shown by the significantly shorter length of graph 12 as compared to graph 11.

Graphs 13 and 14 in Fig. 3 illustrate graphically the data set forth in horizontal row of Table 5 as to pair 3 of the sulphurized oil films therein referred to and further show the superior heat resistance of the pentaerythrityl ester oils over the glyceryl esters of the same unsaturated fatty acids as shown by the shorter length of graph 14 as compared to graph 13.

Figure 4:
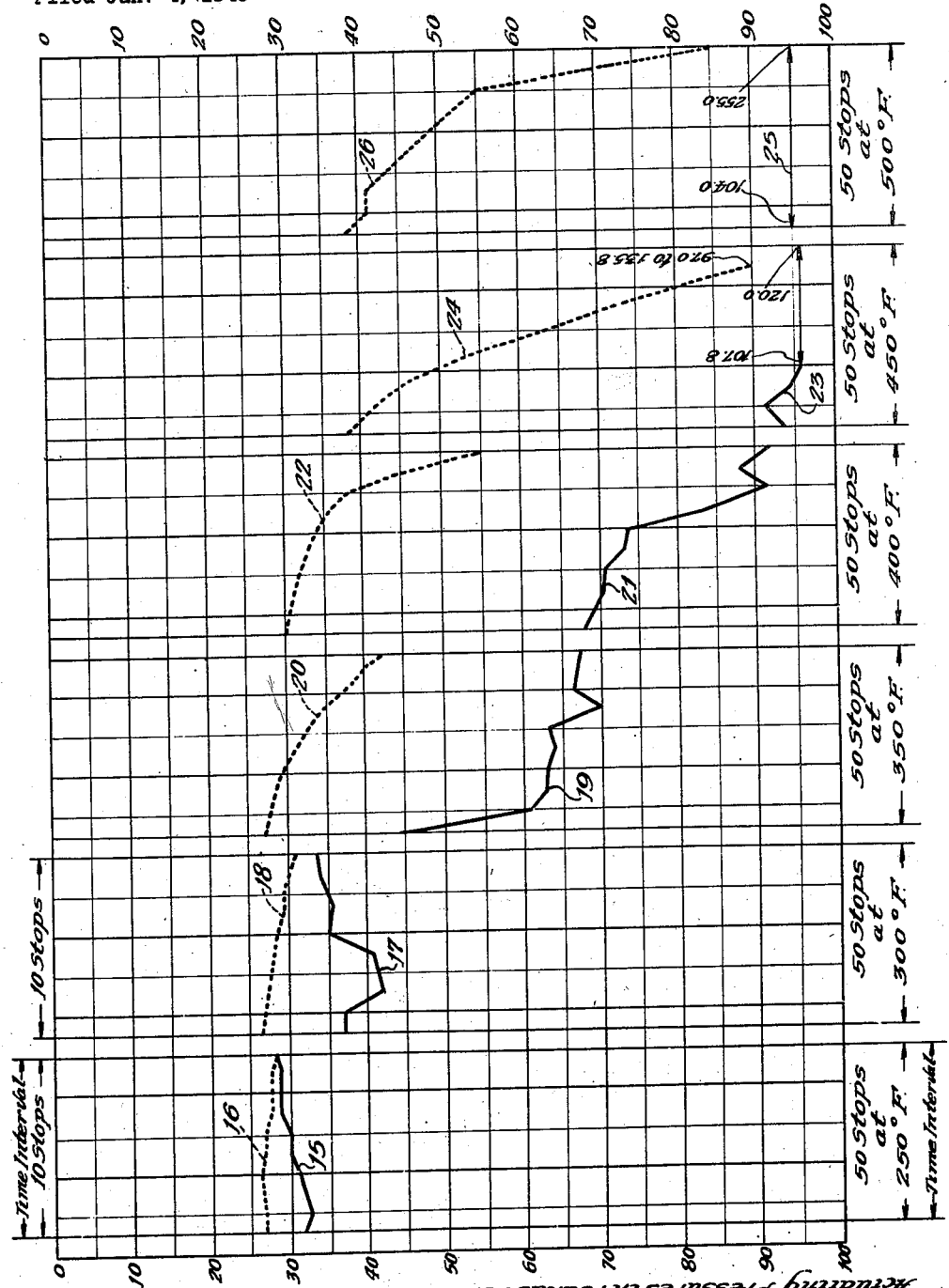
Figure 5:
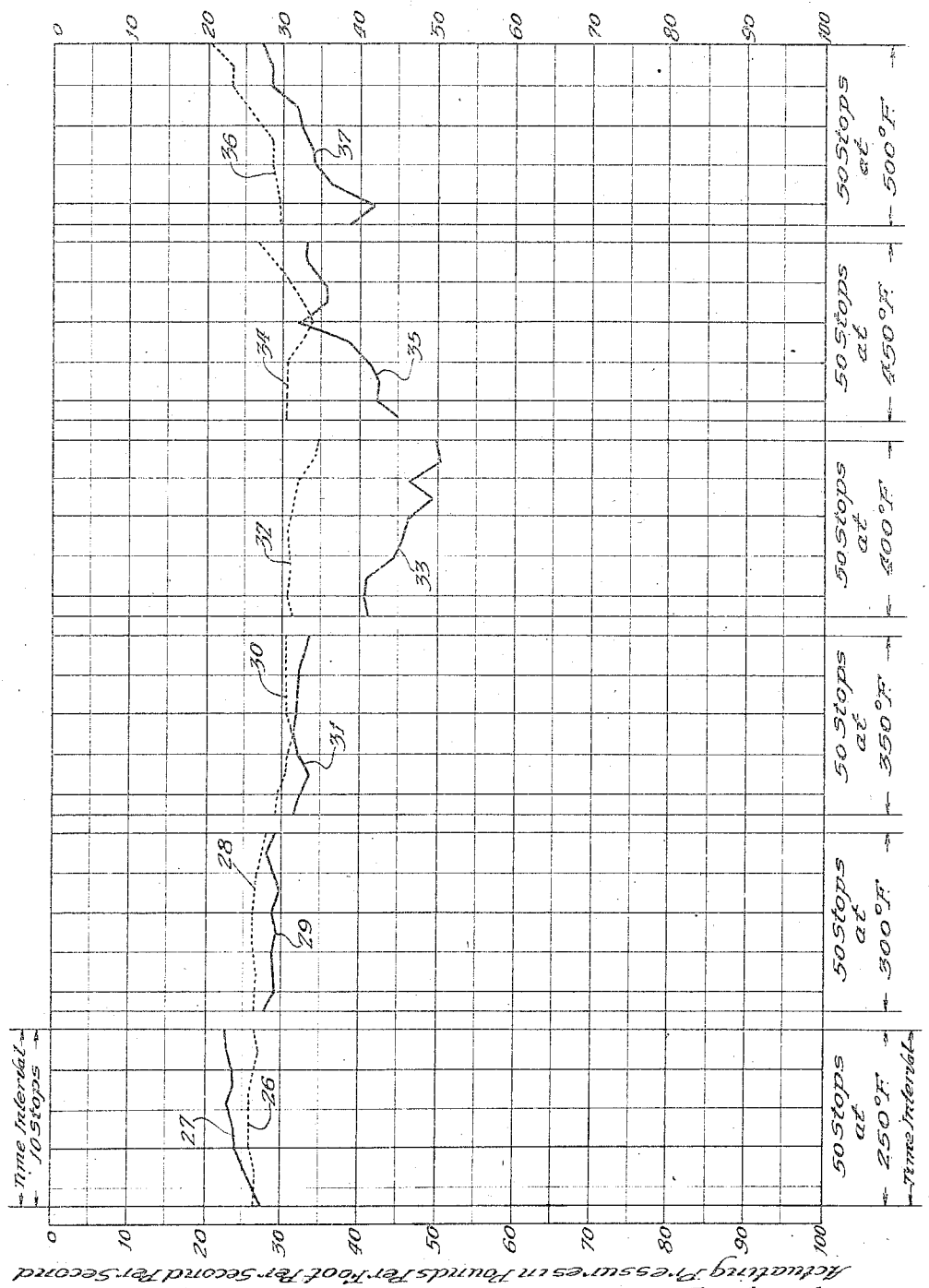

In making the tests, the results of which are shown in the graphs illustrated in Figs. 4 and 5 of the drawings, the specimens of friction elements which were employed were all tested under controlled conditions which were as near identical as possible; that is to say, all variable factors were so controlled that the graphs reflect difference in friction characteristics imparted to the friction elements tested by the different sulphurized bonding oils employed therein. Thus in making the tests, the results of which are illustrated by the graphs in Figs. 4 and 5, specimens of friction elements to be tested were mounted upon the brake assembly of an inertia type dynomometer operated by controlled hydraulic line pressure and all variable factors, such as kinetic energy load on the dynamometer, speed, actuating hydraulic line pressure, volume and temperature of air allowed to come into contact with the brake assembly made substantially constant insofar as possible, the only variable being the frequency of brake application. Moreover, in making the controlled temperature friction tests, the results of which are illustrated in the solid line graphs in Figs. 4 and 5 of the drawings, the internal temperatures of the friction elements tested were held at substantially constant temperatures within a variation of plus or minus 5° F.

The solid line graphs in Figs. 4 and 5, therefore, illustrate variations in friction characteristics of the friction elements tested which are directly attributable to the effect of internal temperature variations upon the bonding agents or upon the bonding and friction-controlling agents embodied therein.

In making the tests, the results of which are illustrated in Figs. 4 and 5, the specimens were subjected to two different types of tests which will now be briefly described. Thus, by reference to the graphs illustrated in Figs. 4 and 5 of the drawings, it will be noted that the ordinates are expressed in terms of pounds actuating pressure per foot per second, per second, corresponding to the rate of deceleration of an automotive vehicle during a braking operation, whereas the abscissae are expressed in time intervals during which a predetermined number of decelerations or so-called stops at various predetermined internal friction element temperatures corresponding to braking operations in an automotive vehicle, were made.

Thus, the graphs represented by the solid lines in Figs. 4 and 5 represent the friction characteristics of the friction elements tested at controlled internal lining temperatures and at progressively increased temperature steps of 50° F., commencing at 250° F. and through 500° F., fifty stops or decelerations being made at each temperature step, as shown by the abscissae at the bottom of Figs. 4 and 5.

The dotted line graphs shown in Figs. 4 and 5 illustrate the results of so-called friction recovery tests made upon the same specimens of friction elements as were employed in making the test, the results of which are represented by the solid line graphs in Figs. 4 and 5 of the drawings. However, in the case of the dotted line graphs shown in Figs. 4 and 5, each friction recovery test was made immediately after the completion of the preceding controlled temperature test upon the specimen. Each of these so-called friction recovery tests consisted of ten decelerations or stops, corresponding to braking operations in an automotive vehicle. As shown in the dotted line graphs in Figs. 4 and 5, the ten decelerations or stops in each friction recovery test were made with a definite time interval between each deceleration or stop to allow the internal temperature of the friction element to decrease from the temperature used in the immediately preceding controlled temperature step to a minimum initial temperature of the friction element of 150° F. or less; that is, to a temperature below the critical temperature of bonding agents heretofore used in friction elements.

The solid line graphs illustrated in Fig. 4 of the drawings show the results of controlled temperature friction tests and the dotted line graphs in this figure show the results of friction recovery tests upon specimens of friction elements bonded with a prior art sulphurized so-called purely polymerized linseed oil, that is to say, a heat-polymerized linseed oil containing substantially no oxidized oil. These were control tests since friction elements embodying such a bonding agent have been known and used heretofore. No friction-controlling or friction-stabilizing agent was embodied in the friction elements which were employed in making the control tests, the results of which are shown in the graphs illustrated in Fig. 4.

By reference to Fig. 4 it will be noted that the solid line graphs 15 and 17 in the first two friction tests, made at controlled internal lining temperatures of 250° F. and 300° F., respectively, are, in general, of a horizontal pattern with a slight upward trend at the end of each test, showing only a relatively small loss of friction or so-called "fade" and a substantially complete recovery. It will also be noted, in this connection, that in the two so-called friction recovery tests made at the relatively low temperatures of 250° F. and 300° F. and the results of which are illustrated by graphs 16 and 18 in Fig. 4, there was very little loss of friction or so-called "fade."

However, upon reference to the controlled friction internal lining temperature test made at the next higher temperature step, namely, 350° F., the results of which are exemplified by graph 19 in Fig. 4, there was a considerable loss of friction-stability or "fade" during the early part of the test, as shown by the sharp and nearly vertical drop in the graph, with no permanent friction recovery, as is indicated by the continued downward trend of the graph.

The friction recovery test which was made immediately following the controlled temperature test at 350° F., and the results of which are exemplified by dotted line graph 20 in Fig. 4, shows a continuous increase in friction as the temperature of the friction element was allowed to decrease from the immediately preceding controlled temperature step to a minimum temperature of 150° F. or less. Hence the final friction during this recovery test was equivalent to the initial friction during the friction test at a controlled temperature step of 250° F.

The loss of friction or so-called "fade" becomes more pronounced in the next succeeding substantially constant internal lining temperature friction test, at 400° F., as shown by the sharp drop in solid line graph 21 in Fig. 4. Moreover, the recovery friction does not increase to the same magnitude as in the preceding steps at 250° F., 300° F., and 350° F., thus showing that the friction element tested was losing, during this test, its capacity for friction recovery after having been subjected to an increase in its internal temperature. Further, the loss of friction stability in this specimen is further indicated by the continued drop of dotted line graph 22 in Fig. 4 and which shows the results of the friction recovery test made upon the specimen immediately following the substantially constant internal lining temperature friction test, the results of which are shown by solid line graph 21 in Fig. 4.

However, by reference to solid line graph 23 in Fig. 4, it will be noted that at the next succeeding substantially constant internal lining temperature friction test at 450° F., the loss in friction stability in the specimen tested was very pronounced. This is shown by the fact that the horizontal portion of this graph 23 between the points 107.8 and 120.0, represents a marked loss in friction which is shown as a horizontal line because the graph drops below the lower limit of the abscissae which can be shown in the drawing. Likewise, in the immediately succeeding friction recovery test, represented by dotted line graph 24 in Fig. 4, the friction element again recovers friction as the temperature of the element is allowed to decrease, but the frictional value of the maximum recovery is below the corresponding values attainable in the preceding steps at 250° F., 300° F., 350° F., and 400° F., respectively.

During the next succeeding internal lining temperature friction test, at 500° F., there was a still further pronounced loss of friction in this specimen, as shown by solid line graph 25 in Fig. 4, and which is represented by a continuous horizontal line, since both deceleration rate extremities of this graph (104.0 and 255.0), and all intermediate points, lie below the limits of the abscissae which can be shown on the drawing. Likewise, in the next succeeding friction recovery test, the results of which are shown by dotted line graph 26 in Fig. 4, the friction element again recovers friction as the temperature of the element is allowed to decrease, but here again the value of the maximum friction recovery is below the maximum value the friction element was able to attain in the preceding steps of 250° F., 300° F., 350° F., and 400° F., respectively. These tests show that a friction element employing the particular prior art bonding agent embodied therein showed a definite and decided loss in friction when the ingredients of the elements were subjected to temperatures above 250° F., this loss in friction stability definitely increasing with each successive increase in the temperature of the element. It is further shown that a friction element employing the particular prior art bonding agent embodied therein which formed the subject matter of these tests exhibited a decreasing degree of friction recovery as the internal temperature of the friction element increased, as is indicated by the continual drop of dotted line graphs 22, 24 and 26 in Fig. 4.

Solid line graphs 27, 29, 31, 33, 35 and 37 in Fig. 5 show the results of controlled friction internal lining temperatures friction tests at 250° F., 300° F., 350° F., 400° F., 450° F., and 500° F., respectively, upon specimens of friction elements bonded with the aforesaid preferred sulphurized synthetic highly conjugated isomerized bonding oil of the present invention, namely, the pentaerythrityl ester of highly conjugated isomerized unsaturated linseed oil fatty acids having 18 carbon atoms in the chain. No special or added friction controlling agents were employed in these specimens. Dotted line graphs 26, 28, 30, 32, 34, and 36 in Fig. 5 show the results of friction recovery tests made upon the same specimens after the corresponding controlled temperature friction tests, the results of which are shown by solid line graphs in Fig. 5.

As may be seen by reference to the graphs shown in Fig. 5, the friction elements tested exhibited excellent friction stability and friction recovery characteristics as shown by the general horizontal trend or pattern of the broken line graphs, the relatively slight "fade" during the controlled temperature test at 400° F., as shown by solid line graph 33, and the noticeable upward trend of solid line graphs 35 and 37 which exemplify the results of the controlled temperature friction tests at the higher temperatures of 400° F., 450° F., and 500° F., respectively. Similarly the friction recovery tests made following the constant temperature tests at the higher temperatures of 400° F., 450° F., and 500° F., and the results of which are shown by graphs 34 and 36 in Fig. 5, show similar good friction characteristics in the tested specimens. Moreover, graphs 32 and 34 in Fig. 5 show only a slight decrease in the maximum friction recovery value below the corresponding value obtained during the initial friction at the controlled temperature step at 250° F.

The friction element specimen to which graphs 27, 29, 31, 33, 35 and 37 in Fig. 5 relate was subjected to successively increasing temperatures of from 250° F. through 500° F., inclusive, and the small degree of friction loss in this specimen is shown by these graphs. Moreover, said friction element, embodying a bonding agent of the present invention, exhibited definite friction stability as indicated by its friction recovery when subjected to successive temperatures of from 250° F. through 500° F., inclusive, as shown by graphs 26, 28, 30, 32, 34 and 36 in Fig. 5.

Likewise, by comparing the graphs shown in Fig. 5 with those in Fig. 4, there will be seen the superior friction characteristics, including the marked improvement in stability of friction elements bonded with a sulphurized highly conjugated synthetic bonding oil of the present invention, namely, the pentaerythrityl esters of highly conjugated isomerized linseed oil unsaturated fatty acids having 18 carbon atoms in the chain, over otherwise similar friction elements bonded with a comparable sulphurized bonding oil of the prior art.

Graphs 38 and 39 in Fig. 6 show the friction results of a so-called hot drum wear test upon friction elements bonded with the same sulphurized prior art vegetable drying oil as is referred to in the description of the graphs shown in Fig. 4, namely, a so-called purely polymerized linseed oil, that is, a heat-polymerized linseed oil containing substantially no oxidized oil. This oil had a viscosity of 600 poises at atmospheric temperatures and an acid number of about 2.0.

Graphs 40 and 41 in Fig. 6 show the friction results of so-called hot drum wear tests upon friction elements otherwise identical to those to which graphs 38 and 39 in Fig. 6 relate, except that the bonding agent which was employed in the friction element to which graphs 40 and 41 relate was the same sulphurized highly conjugated isomerized synthetic oil which is referred to in the description of the graphs shown in Fig. 5, namely, the pentaerythrityl ester of highly conjugated isomerized unsaturated linseed oil fatty acids having 18 carbon atoms in the chain. This oil had the same viscosity and acid number as the bonding oil employed in the friction element to which graphs 38 and 39 in Fig. 6 relate.

The improved friction characteristics of friction elements bonded with the aforesaid preferred sulphurized highly conjugated isomerized synthetic reesterified polyhydric alcohol ester bonding oil of the present invention over otherwise similar friction elements bonded with a comparable prior art bonding oil referred to above in the description of the graphs in Fig. 4 and in the description of graphs 38 and 39 in Fig. 6 is shown by the comparative lengths of graphs 38, 39, 40 and 41.

Thus graphs 38 and 41 show the average friction of the specimens for 200 stops or deceleration, corresponding to braking operations at 30 M. P. H. on an inertia type of dynamometer, stopping at a deceleration rate of 11 ft. per second, per second, with the temperature of the air in contact with the drum and brake assembly and attached friction element specimens being held substantially constant at 70° F. by means of a controlled air stream, and with the drum and brake assembly temperature being held at a substantially constant temperature of 240° F. at thirty miles per hour.

In the case of the 60 M. P. H. test, the results of which are shown in graphs 39 and 41, the graphs show the average friction for 100 stops, continuous operation, stopping at a deceleration rate of 11 ft. per second, per second, with the temperature of the atmospheric air in contact with the drum and brake assembly being held substantially constant at 70° F., by means of a controlled air stream, and the temperature of the drum and brake assembly being held within limits of from 610° F. to 660° F.

Thus it will be seen that the greater length of graphs 38 and 39 in Fig. 6 as compared to graphs 40 and 41 respectively, indicates a marked decrease in friction, due to heat decomposition of and resulting lack of stability in the bond, and consequent rapid wear and erratic friction, in the friction elements bonded with the sulphurized prior art bonding oil to which graphs 38 and 39 relate as compared to friction elements bonded with an oil of the present invention and to which graphs 40 and 41 relate and which exhibited excellent friction characteristics including friction stability and resistance to heat decomposition of the bond of the present invention employed therein.

Graphs 42, 43 and 44 in Fig. 7 show the results of so-called cold drum performance tests, at actuating line pressures ranging from 100 to 900 lbs. at each speed indicated, upon friction elements bonded with the same prior art bonding oil which is identified in the description of the graphs shown in Fig. 4, namely, sulphurized so-called purely polymerized linseed oil, that is, a sulphurized heat-polymerized linseed oil containing substantially no oxidized oil. Similarly, graphs 45, 46 and 47 in Fig. 7 show the results of so-called cold drum performance tests, at actuating line pressures ranging from 100 to 900 lbs. at each speed indicated, upon friction elements bonded with the aforesaid highly conjugated isomerized synthetic reesterified polyhydric alcohol ester bonding oil of the present invention, namely, the pentaerythrityl ester of isomerized unsaturated linseed oil fatty acids having 18 carbon atoms in the chain. The viscosity and acid number of this oil were identical to those of the prior art bonding oil used in the specimens to which graphs 42, 43 and 44 relate.

The length of the graphs in Fig. 7 represents the average friction for all hydraulic line pressures used at each speed and the superior characteristics of friction elements bonded with the aforesaid sulphurized highly conjugated isomerized synthetic bonding oil of the present invention, over otherwise similar friction elements bonded with the comparable sulphurized prior art bonding oils is shown by the relatively shorter length of each of graphs 45, 46 and 47 with the corresponding length of graphs 42, 43 and 44 in Fig. 7.

No special or added friction controlling or friction-enhancing agents were employed in any of the friction elements tested, and the results of which are shown by the graphs in Figs. 6 and 7, nor in the friction elements tested and the results of which are shown in the graphs illustrated in Fig. 8 which will now be described.

Graphs 48 and 49 in Fig. 8 show the results of so-called friction or "fade" tests upon friction elements bonded with the aforesaid prior art bonding oil, which is referred to in the description of Figs. 4, 6 and 7, namely, sulphurized purely polymerized linseed oil, that is, a sulphurized heat-polymerized linseed oil containing substantially no oxidized oil.

Graphs 50 and 51 in Fig. 8 show the results of so-called friction or "fade" tests upon friction elements bonded with the aforesaid sulphurized highly conjugated synthetic bonding oil of the present invention which is referred to in the description of Figs. 5, 6 and 7, namely, the pentaerythrityl esters of highly conjugated isomerized unsaturated linseed oil fatty acids having 18 carbon atoms in the chain. This oil had the same viscosity and acid number as the prior art bonding oil referred to in the description of graphs 48 and 49 in Fig. 8. In making the test, the temperature of the brake and drum assembly was controlled so as not to exceed 540° F. during the 45 M. P. H. test or 670° F. during the 60 M. P. H. test.

The length of each of the graphs in Fig. 8 shows the comparative average variation in friction during the test and the superiority of friction elements bonded with the aforesaid sulphurized highly conjugated synthetic bonding oil of the present invention over friction elements bonded with the aforesaid sulphurized prior art bonding oil. This is shown by the fact that graph 49 in Fig. 8, representing the results of the 60 M. P. H. friction or "fade" test upon specimens of prior art friction elements, shows a pronounced friction loss whereas graph 51, representing the results of the friction or "fade" test at 60 M. P. H. upon a friction element made according to the practice of the present invention, shows a marked increase in friction rather than a loss in friction or "fade" as was exhibited by the prior art friction element in the comparable test at 60 M. P. H. (graph 49).

It will be noted by a careful comparison of the graphs shown in Figs. 4 and 5 of the drawings that the specimens of friction elements which were tested, and which were bonded with a bonding oil of the present invention namely, the pentaerythrityl esters of highly conjugated unsaturated isomerized linseed oil fatty acids having 18 carbon atoms in the chain, exhibited a significantly more uniform pattern of friction stability and less tendency toward an undesirable build-up in friction, as well as less tendency toward an equally desirable loss of friction or "fade," than was exhibited by the specimens of friction elements which were bonded with a comparable prior art bonding oil. This is particularly shown by the generally horizontal trend of the dotted line graphs in Fig. 5, and which represent the results of tests made before the specimens of friction elements tested had been subjected to previous prolonged and severe tests and the results of which previous tests are shown by the graphs in Figs. 6 and 8.

It is to be borne in mind in connection with the graphs shown in the drawings, and particularly the graphs shown in Figs. 4 and 5, that these graphs show a general trend and the general friction characteristics of the friction elements tested and it will be understood that while the same general trend of these graphs were reproduced in other types of tests upon like friction elements and under the same general conditions, graphs having the same identical curvatures or configurations would not necessarily be reproduced in plotting the results of such other tests as some variations would inevitably result. Such variations would not, however, detract from the general trends indicated by the graphs and the comparisons afforded thereby.

It will thus be seen from the foregoing description, considered in conjunction with the graphs shown in the drawings, that the present invention affords new and improved friction elements and bonding agents therefor, and a new and improved method of making such friction elements, and thus accomplishes its intended objects including those hereinbefore pointed out and others which are inherent in the invention.

We claim:

1. A friction element comprising friction material and a bond comprised of sulphurized bonding oil comprised of one or more substances selected from the group consisting of the glyceryl esters and the pentaerythrityl esters of highly conjugated drying oil fatty acids having 18 carbon atoms in the chain, the said bonding oil having a Woburn iodine number of not substantially lower than 125 nor substantially higher than 180, and the degree of conjugation in the said bonding oil being not substantially less than 27.5 per cent of the total unsaturation of the said bonding oil prior to its sulphurization.

2. A friction element as defined in claim 1 in which the said glyceryl esters and the said pentaerythrityl esters are the glyceryl esters and the pentaerythrityl esters of drying oil fatty acids derived from vegetable drying oil.

3. A friction element as defined in claim 1 in which the said glyceryl esters and the said pentaerythrityl esters are the glyceryl esters and the pentaerythrityl esters of drying fatty acids derived from linseed oil.

4. A friction element as defined in claim 1 in which the said glyceryl esters and the said pentaerythrityl esters are the glyceryl esters and the pentaerythrityl esters of linoleic acid ($C_{18}H_{32}O_2$) and linolenic acid ($C_{18}H_{30}O_2$).

5. A friction element comprising friction material and a bond comprised of sulphurized bonding oil and sulphurized oil-modified phenolic-aldehyde resin embodying an oil-modifying component, the said sulphurized bonding oil and the said oil-modifying component of the said sulphurized oil-modified phenolic-aldehyde resin being comprised of one or more substances selected from the group consisting of the glyceryl esters and the pentaerythrityl esters of highly conjugated drying oil fatty acids having 18 carbon atoms in the chain, the said sulphurized bonding oil and the said oil-modifying component of the said sulphurized oil-modified phenolic-aldehyde resin having a Woburn iodine number of not substantially lower than 125 nor substantially higher than 180, and the degree of conjugation in the said sulphurized bonding oil and in the said oil-modifying component of the said sulphurized oil-modified phenolic-aldehyde resin being not substantially less than 27.5 per cent of the total unsaturation of the said sulphurized bonding oil and of the said oil-modifying component of the said sulphurized oil-modified phenolic-aldehyde resin prior to sulphurization thereof.

6. A friction element as defined in claim 5 in which the said glyceryl esters and the said pentaerythrityl esters are the glyceryl esters and the pentaerythrityl esters of drying oil fatty acids derived from vegetable drying oil.

7. A friction element as defined in claim 5 in which the said glyceryl esters and the said pentaerythrityl esters are the glyceryl esters and the pentaerythrityl esters of drying oil fatty acids derived from linseed oil.

8. A friction element as defined in claim 5 in which the said glyceryl esters and the said pentaerythrityl esters are the glyceryl esters and the pentaerythrityl esters of linoleic acid ($C_{18}H_{32}O_2$) and linolenic acid ($C_{18}H_{30}O_2$).

9. A friction element comprising friction material and a bond comprised of sulphurized bonding oil and sulphurized oil-modified phenolformaldehyde resin embodying an oil-modifying component, the said sulphurized bonding oil and the oil-modifying component of the said sulphurized oil-modified phenol-formaldehyde resin being comprised of one or more substance selected from the group consisting of the glyceryl esters and the pentaerythrityl esters of highly conjugated drying oil fatty acids having 18 carbon atoms in the chain, the said sulphurized bonding oil and the said oil-modifying component of the said sulphurized oil-modified phenol-formaldehyde resin having a Woburn iodine number of not substantially lower than 125 nor substantially higher than 180, and the degree of conjugation in the said sulphurized bonding oil and in the said oil-modifying component of the said sulphurized oil-modified phenol-formaldehyde resin being not substantially less than 27.5 per cent of the total unsaturation of the said sulphurized bonding oil and of the said oil-modifying component of the said sulphurized oil-modified phenol-formaldehyde resin prior to sulphurization thereof.

10. A friction element as defined in claim 9 in which the said glyceryl esters and the said pentaerythrityl esters are the glyceryl esters and the pentaerythrityl esters of drying oil fatty acids derived from vegetable drying oil.

11. A friction element as defined in claim 9 in which the said glyceryl esters and the said pentaerythrityl esters are the glyceryl esters and the pentaerythrityl esters of drying oil fatty acids derived from linseed oil.

12. A friction element as defined in claim 11 in which the said glyceryl esters and the said pentaerythrityl esters are the glyceryl esters and the pentaerythrityl esters of linoleic acid ($C_{18}H_{32}O_2$) and linolenic acid ($C_{18}H_{30}O_2$).

ROBERT B. BENNETT.
RAY E. SPOKES.

REFERENCES CITED

The following references are of record in the file of this patent:

UNITED STATES PATENTS

| Number | Name | Date |
|---|---|---|
| 2,114,121 | Bender | Apr. 12, 1938 |
| 2,242,489 | Turkington | May 20, 1941 |
| 2,350,583 | Bradley | June 6, 1944 |
| 2,358,623 | Burr | Sept. 19, 1944 |
| 2,369,502 | Walker | Feb. 13, 1945 |
| 2,391,416 | Hart | Dec. 25, 1945 |